G. ALEXANDER.
NUT TAPPING MACHINE.
APPLICATION FILED SEPT. 12, 1913.
1,094,383.
Patented Apr. 21, 1914.
6 SHEETS—SHEET 1.
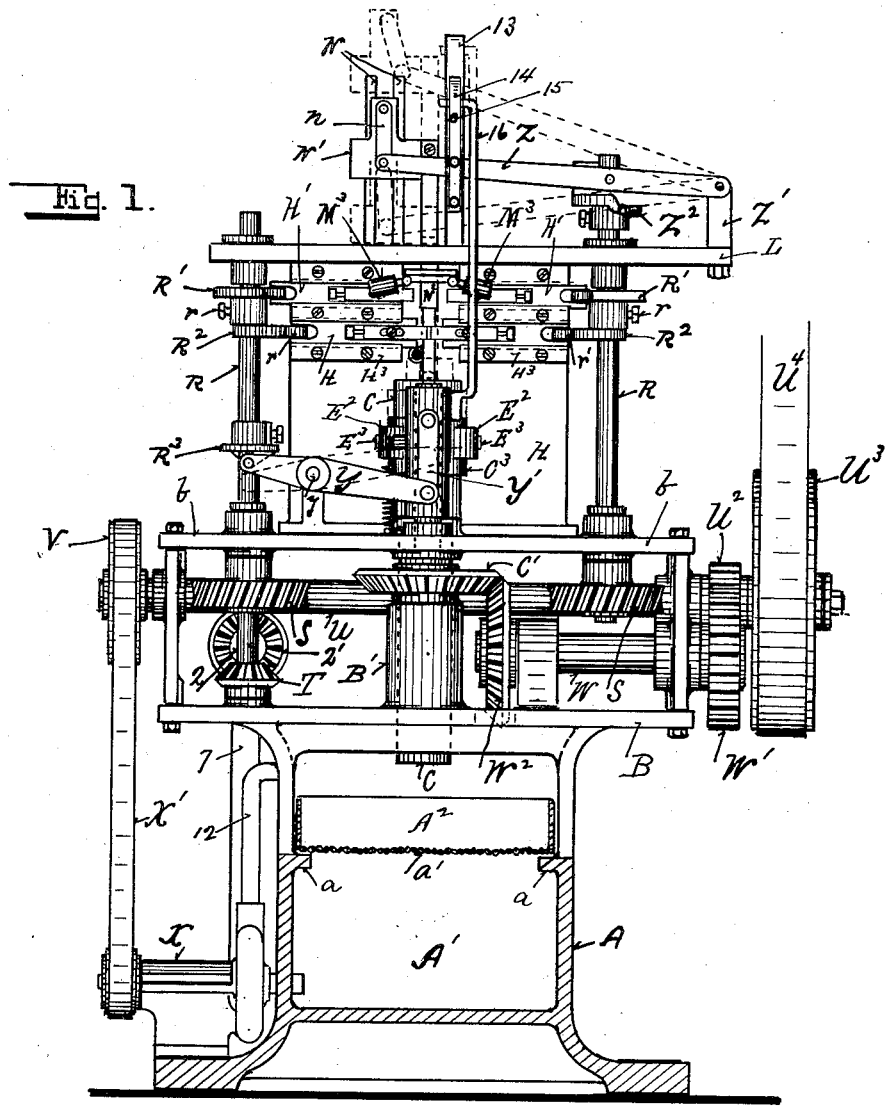
Witnesses.
Inventor.

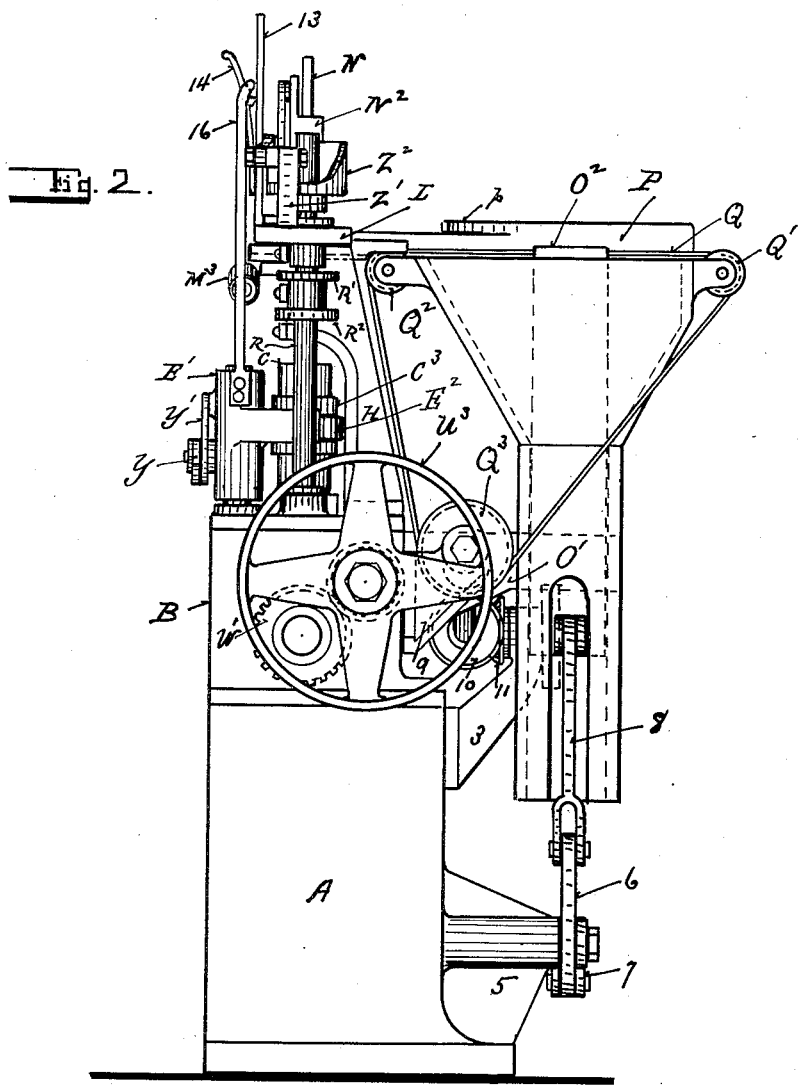

G. ALEXANDER.
NUT TAPPING MACHINE.
APPLICATION FILED SEPT. 12, 1913.
1,094,383.
Patented Apr. 21, 1914.
6 SHEETS—SHEET 3.
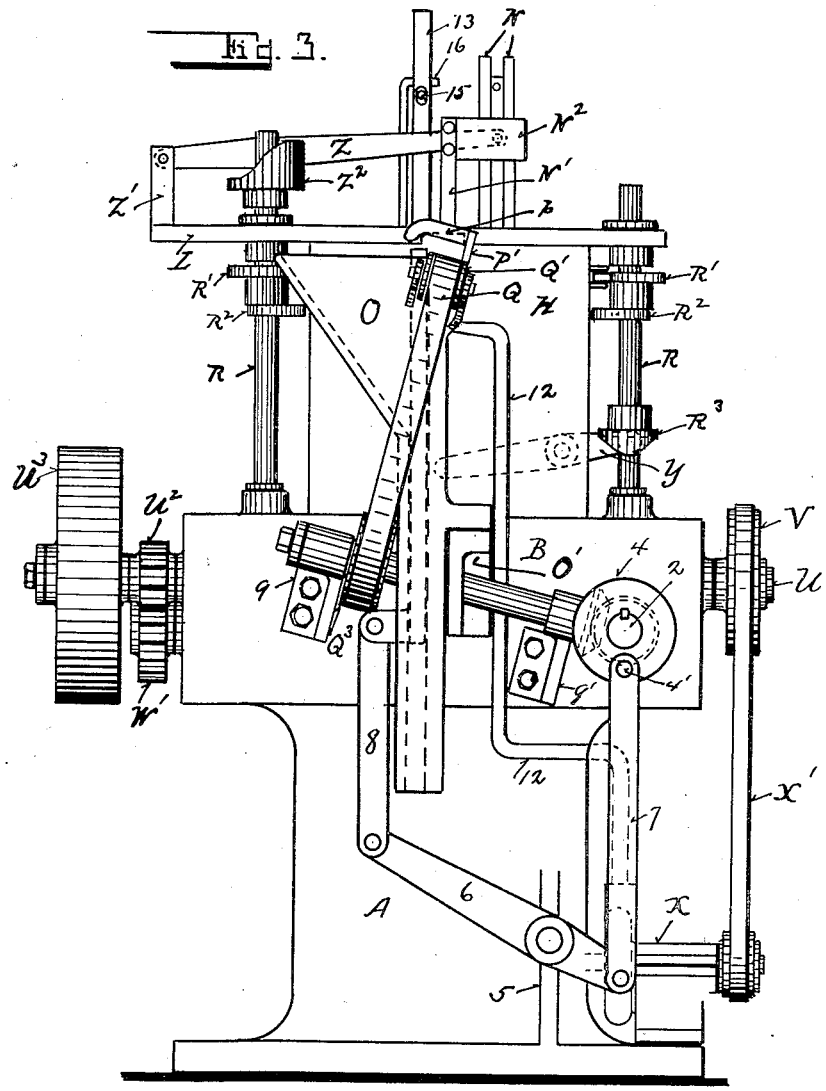

G. ALEXANDER.
NUT TAPPING MACHINE.
APPLICATION FILED SEPT. 12, 1913.
1,094,383.
Patented Apr. 21, 1914.
6 SHEETS—SHEET 4.
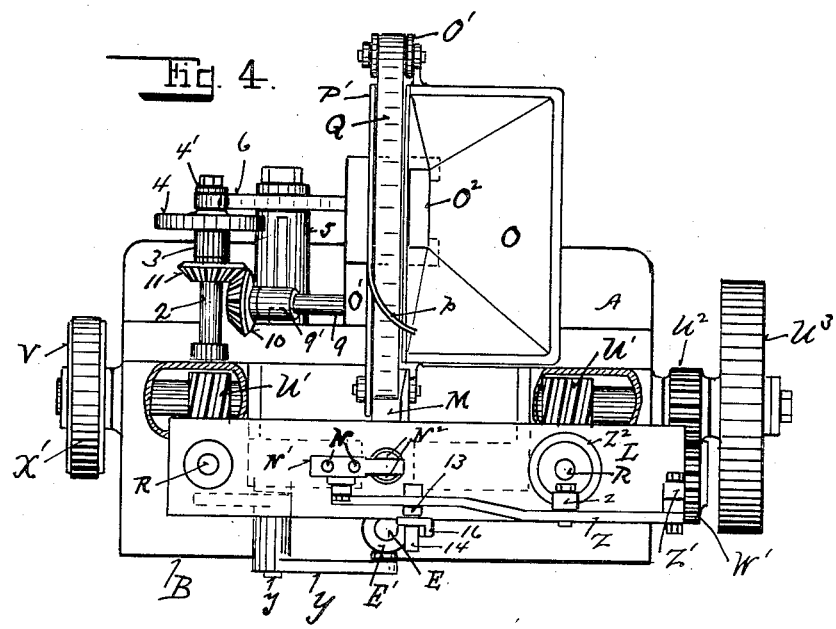
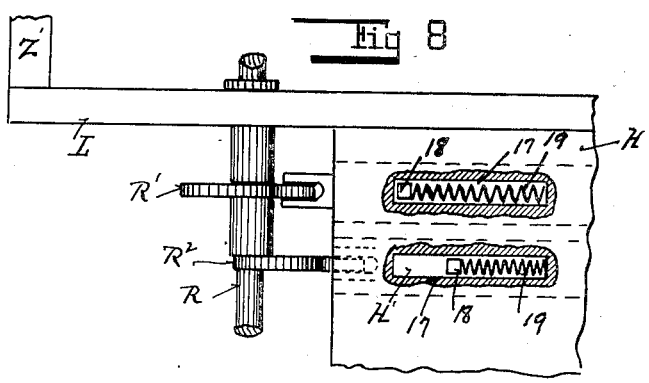
Witnesses.
Inventor.

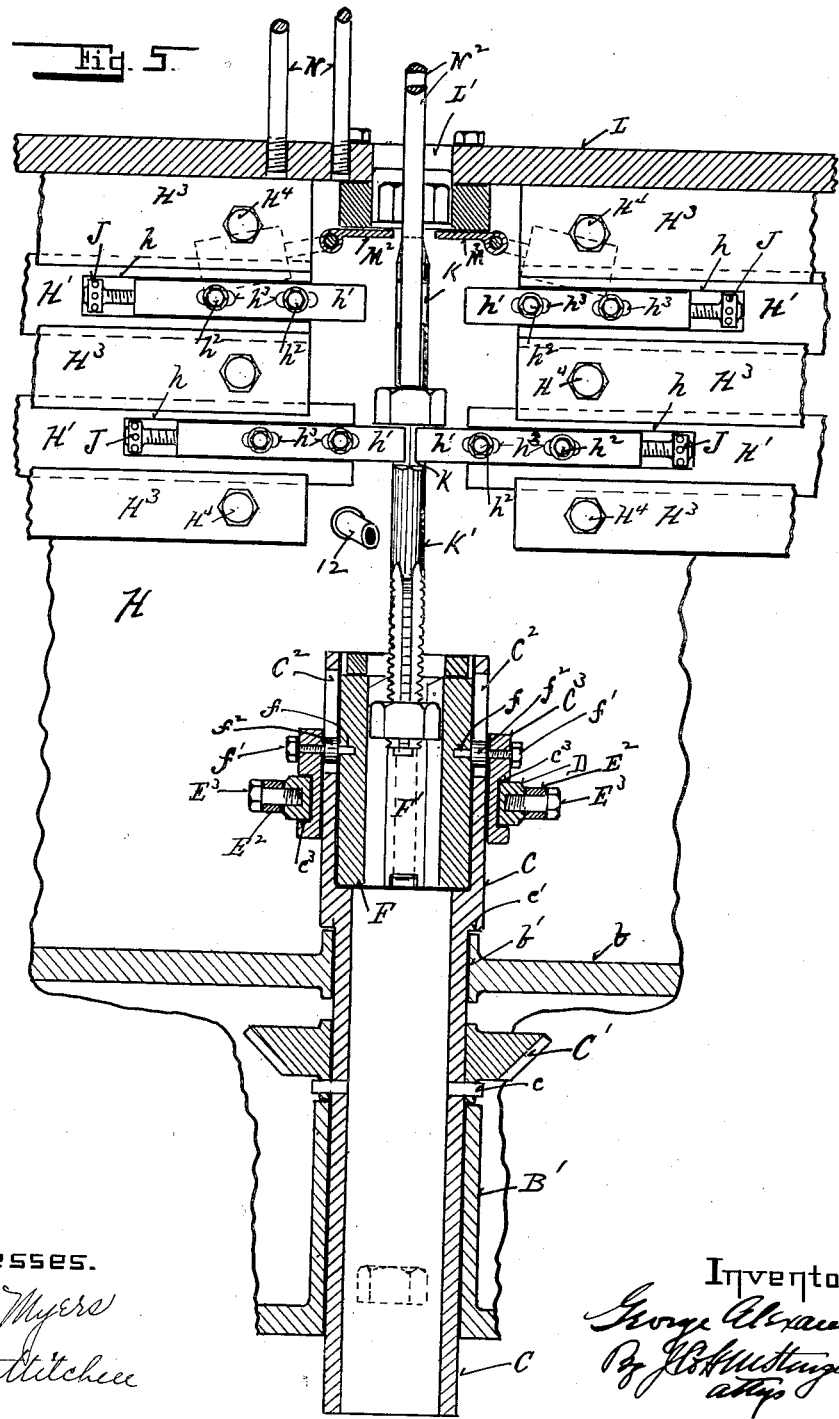

G. ALEXANDER.
NUT TAPPING MACHINE.
APPLICATION FILED SEPT. 12, 1913.
1,094,383.
Patented Apr. 21, 1914.
6 SHEETS—SHEET 6.
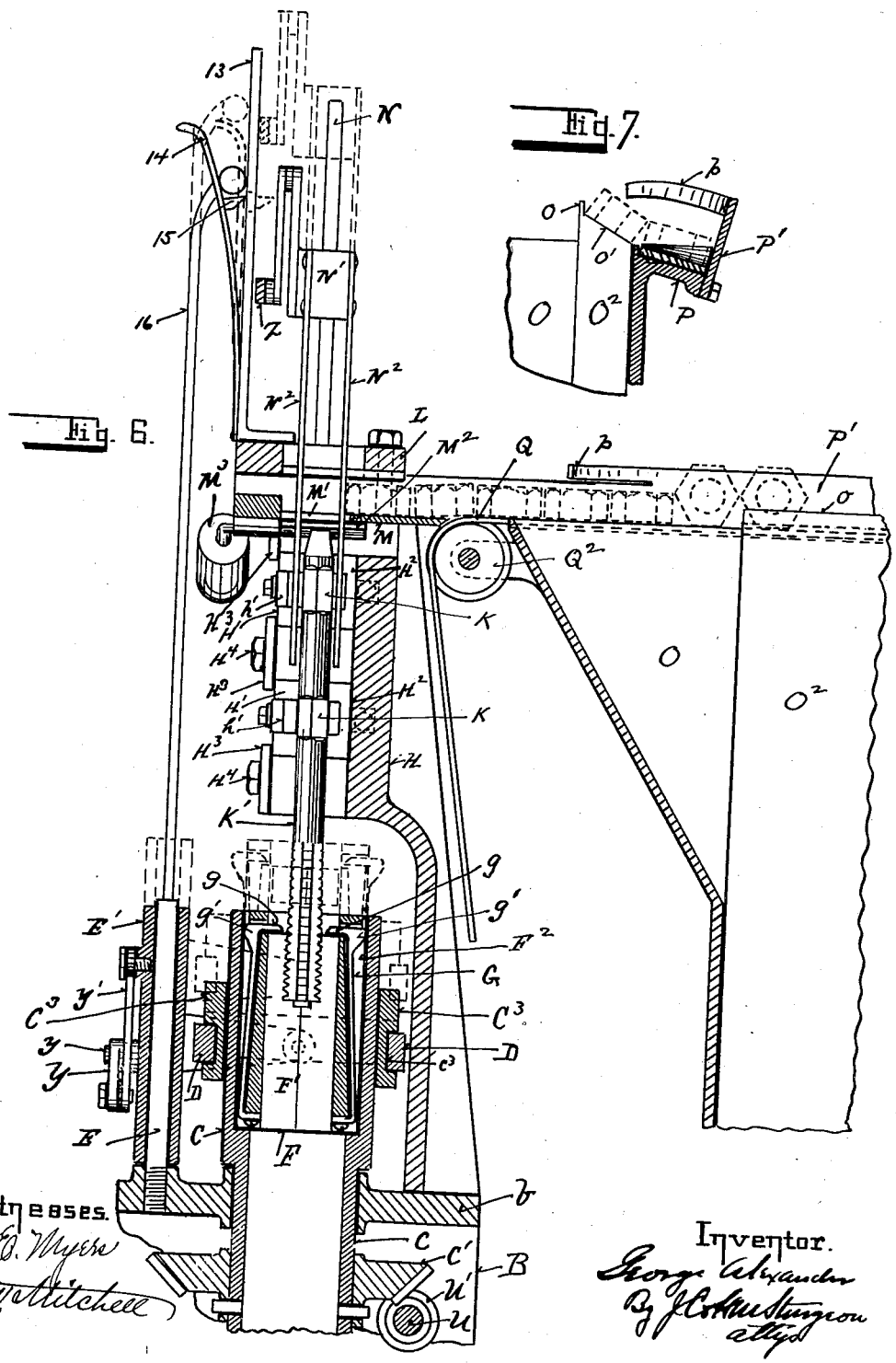

UNITED STATES PATENT OFFICE.

GEORGE ALEXANDER, OF ERIE, PENNSYLVANIA, ASSIGNOR OF ONE-HALF TO PHILIP W. DIETLY, OF ERIE, PENNSYLVANIA.

NUT-TAPPING MACHINE.

1,094,383.  Specification of Letters Patent.  Patented Apr. 21, 1914.

Application filed September 12, 1913. Serial No. 789,481.

*To all whom it may concern:*

Be it known that I, GEORGE ALEXANDER, a citizen of the United States, residing at Erie, in the county of Erie and State of Pennsylvania, have invented certain new and useful Improvements in Nut-Tapping Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to nut-threading machines, in which the nuts to be threaded, are dropped over the shank of the screw-tap, and are engaged by hollow rotary mechanism by which they are caused to revolve around the tap until they drop off of the lower end of the tap.

The object of my invention is to construct suitable mechanism for holding the thread cutting tap; and suitable rotary mechanism for receiving and grasping the nut-blank and causing it to rotate around the threading-tap; and automatic mechanism to raise nut-blanks onto the shank of the thread-cutting-tap; and automatic mechanism to raise the rotary mechanism upward to receive a new blank when the same drops to the cutting threads on the tap; and to construct suitable operating mechanism for the several active elements of the machine so timed that the action of each element will be in proper relative sequence to the other elements.

Another object of my invention is to so construct and combine the several coöperative mechanisms of the machine that their liability to disarrangement will be reduced to a minimum and yet may be readily adjusted when desired.

The features of my invention are hereinafter fully set forth, and are illustrated in the several drawings in which:—

Figure 1, is a front view in elevation of a nut-threading machine embodying my invention. Fig. 2, is an endwise view in elevation, of the same. Fig. 3, is a rear side view in elevation, of the same. Fig. 4, is a top or plan view of the same, with portions of the frame broken away. Fig. 5, is an enlarged front view of a fragment of the same, partially in elevation and partially in vertical central section. Fig. 6, is an enlarged view in transverse, vertical, central section, of a portion of the same. Fig. 7, is a sectional view of a fragment of the hopper and conveyer belt of the same. Fig. 8, is a rear view in elevation of a fragment of the same with portions broken away.

In these drawings A, indicates the base frame of the machine, in the intermediate portion of which there is a chamber A', for reception of oil or other lubricants used on thread-cutting tools. Within this base frame A, there are ledges $a$, provided, upon which I place a receptacle A², having a screen bottom $a'$, which receptacle is adapted to receive the finished nuts and cuttings from the threading-tap, and permit oil or other lubricant to pass through the screen $a'$, into the chamber A'. Upon the base frame A, I place a gear case B. Within this gear case B, I mount a vertical hollow shaft C, in a bearing B', and upon this hollow shaft C, I secure a miter or bevel gear-wheel C', by means of pins $c$, or other suitable means, to prevent the gear-wheel from rotating upon the shaft. The hollow shaft C, extends upwardly through an opening $b'$, in the upper wall $b$, of the gear case B, where the shaft is provided with a shoulder $c'$, which supports the shaft C, vertically. The hollow vertical shaft C, is provided, near its upper end, with vertical slots $c^2$. Around the exterior of the upper end of the vertical shaft C, I place a ring C², having a peripheral groove or slot $c^3$, in which groove or slot I place a ring D, so that the said ring D, may rotate easily in said groove $c^3$. Upon the gear case B, I secure an upright guide-post E, and upon this post E, I place a sleeve E', which has arms E², thereon, which extend around and span the ring D, and are pivoted thereto by means of the bolts E³, so that the rings C and D, are vertically supported by the sleeve E', and arms E².

Within the upper portion of the vertical shaft C, I place a sleeve F, which is provided with a longitudinal opening F', of any desired shape; square, hexagonal, or octagonal. The sleeve F, is also provided with radial openings $f$, adapted to receive trunnion pins $f'$, extending inwardly from the ring C³, through the slots C², in the shaft C. Upon the trunnion pins $f'$, within the slots C², I preferably place rollers $f^2$. In Fig. 5, I show the pins $f'$, as being provided with screw-threads. This enables the operator to easily remove said pins when it is desired to remove the sleeve F. The sleeve F, is provided with longitudinal slots $F^2$, on opposite sides thereof, in which slots I place springs G, the upper ends $g$, of which are turned inward, and a shoulder $g'$, is provided to be engaged by the shaft C, and force said springs inward so that their internal ends $g$, will extend into the opening F', in the sleeve F, as shown by full lines in Fig. 6, and when said sleeve F, is raised upwardly, will permit said internal ends $g$, from being withdrawn from said opening F', as shown by broken lines in said figure.

Upon the gear case B, I place an upright frame H, and upon this frame H, I place jaw-carrying slides H', which are properly mounted in slide-ways $H^2$, in the face of the upright frame H, and are secured thereon by plates $H^3$, and bolts $H^4$. The slides H', are slotted out as shown at $h$, to receive the tap-jaws $h'$, which are secured in the slots $h$, by means of bolts $h^2$, which pass through elongated openings $h^3$, in said jaws $h'$. I also preferably provide adjusting screws J, which are tapped into the ends of the jaws $h'$, and contact with the rear end walls of the slots $h$, so that said jaws $h'$, may, by means of said screws, be longitudinally adjusted with relation to the slides H'. The front ends of the jaws $h'$, are notched vertically to receive the corners of squared spaces K, on the shank of the thread-cutting tap, and said jaws being so positioned as to hold the tap K', concentrically within the sleeve F. Upon the upright frame H, I place a bar L, having an opening L', therethrough concentric with the tap K', and sleeve F, and on the underside of this bar L, I secure a nut-supporting plate M, having an opening M', therethrough concentric with said tap K. To the underside of the plate M, there are hinged trap-doors $M^2$, which extend inward toward each other and partially close the opening M', in the plate M, and are provided with weighted arms $M^3$, of sufficient gravity to support a nut-blank thereon. Upon the bar L, I secure upright guide-posts N, upon which there is a slide N', carrying feeding fingers $N^2$, adapted to pass downward between the trap-doors $M^2$, and span the shank of the threading tap held in position by a pair of jaws $h'$.

For supplying nut-blanks to the plate M, I provide a hopper O, secured upon a bracket O', extending from the rear side of the gear case B. This hopper is provided with slide-ways $O^2$, in which there is placed a vertically movable slide $O^3$, the upper end of which is provided with a lip $o$, and an inclined surface $o'$, extending downwardly therefrom. On the side of the hopper O, adjacent to the slide $O^2$, I place a bracket P, having an upturned rail or flange, P', along one edge thereof, and upon this bracket P, and endless belt Q, mounted upon pulleys Q' $Q^2$, and $Q^3$, travels toward the plate M, to carry nut-blanks deposited thereon by the slide $O^2$, onto the plate M, and force one into place in the opening M', so that it will rest upon the trap-doors $M^2$. The rail or flange P', is provided with an arm $p$, which curves over the belt Q, toward the hopper O, at a sufficient distance above the belt Q, so that nut-blanks which are deposited thereon in a vertical, edgewise position, or one on top of another, will be turned down into a flat-wise position or brushed off of the belt Q, into the hopper O.

For operating the jaw-carrying slides H', I mount vertical shafts R R, in the upper wall $b$, of the gear case B, and in the bar L, opposite to the outer ends of the jaw carrying slides H', and secure thereon adjacent to the outer ends of said slides, cams R' and $R^2$, by means of set screws $r$, and in the ends of said slides H', I pivot small rollers $r'$, which are engaged by said cams. On the lower ends of the vertical shafts R, are secured worm-gear wheels S. One of the shafts R, extends downwardly to, and is journaled in the lower wall of the gear case B, and has secured thereon a miter gear T, for the purpose hereinafter set forth. Longitudinally through the gear-case B, there is mounted a drive shaft U, upon which there are secured worms U', (see Fig. 4) which intermesh with the worm gear wheels S. The shaft U, extends outwardly through the end walls of the gear case B, and on one end thereof I secure a gear pinion $U^2$, and a band wheel $U^3$, upon which a driving belt $U^4$, may be placed for driving the machine. Upon the opposite end of the shaft U, I place a small pulley V, for the purpose hereinafter set forth. For driving the hollow shaft C, I mount a shaft W, in the gear case B, one end thereof extending outwardly through one end of the gear case B, where a spur gear W', is secured thereon, which intermeshes with the gear pinion U', on the shaft U. On the other end of the shaft W, there is secured a miter gear $W^2$, which intermeshes with the miter gear C', on the hollow shaft C. For supplying oil to the thread cutting tap K', I provide a pump mechanism X, which is operated by means of a belt X', from the pulley V. For giving vertical movement to the sleeve E', and nut-holder F, I provide a lever Y, mounted upon a fulcrum $y$, on the machine frame, one end of which is connected to the sleeve E', by means of a link Y'. The opposite end of the lever Y, is engaged by a cam $R^3$, on one of the vertical shafts R, so that as the cam $R^3$, is rotated, the sleeve E', and nut-holding sleeve F, will be raised and lowered.

For operating the slide N', and feeding fingers N², I provide a lever Z, which is pivoted to a post Z', secured on the bar L, and upon the upper end of one of the shafts R, I secure a cam Z², which engages a roller z, pivoted to the lever Z. The lever Z, is connected to the slide N', by means of a link n, so that as the cam Z², is rotated by the shaft R, the slide N' and feeding fingers N², are given the proper intermittent vertical movement.

For operating the vertical nut-raising slide O², in the hopper O, I mount a short transverse shaft 2, in the rear wall of the gear case B, and in a suitable bracket 3, (see Figs. 2 and 4) secured to the rear side of the machine frame, and within the gear case B, there is secured on the shaft 2, a miter gear wheel 2', which intermeshes with and is driven by the miter gear T, on the shaft R.
On the opposite end of the shaft 2, there is secured a crank disk 4, having secured thereon a wrist pin 4'. Pivoted on a bracket 5, on the machine frame A, there is a lever 6, one end of which is connected with the wrist pins 4', by means of a link 7, and the other end of the lever 6, is connected with the slide O', in the hopper O, by means of a link 8.

For operating the driving pulley Q³, of the carrying belt Q, I mount a shaft 9, in suitable brackets 9', secured on the rear side of the gear case B, upon one end of which shaft 9, the pulley Q³, is secured, and on the other end of said shaft 9, a miter gear wheel 10, is secured, and upon the shaft 2, and intermeshing with the miter gear wheel 10, there is secured another miter gear wheel 11, so that as the shaft 2, is rotated, the shaft 9, rotates to drive the nut-carrying belt O.
The oil conveying pipe 12, carries oil from the pump mechanism X, upward to the threading tap K'.

In order to force the slides H', backward, when they are released by the cams R' and R², I provide in the upright frame H, behind each of said slides, a mortised recess 17, (see Fig. 8) into which a stud 18, secured in the slides H', extends, and between said studs and the opposite ends of said recesses I place springs 19, which operate to force the slides H', backward so that the rollers r', will at all times follow the cams R', and R², as they are rotated by the shafts R.

The operation of the mechanism hereinbefore described is as follows:—The hopper O, is supplied with nut-blanks to be threaded. Oil or other lubricating liquid is supplied to the oil chamber A, in the base frame of the machine. Power is then applied to the shaft U, which is also communicated to the shaft W, by means of the gear wheels U², and W', and the hollow vertical shaft C, and shafts R, are, by means of the miter gears W² and C', and the worm gears S and U', caused to rotate, which causes the cams R', to force the upper pair of jaw-carrying slides H', to move inward so that the jaws h', carried thereby will grasp the shank of the threading tap K', and simultaneously will cause the cam Z², to raise the lever Z, slide N', and feeding fingers N², upward so that a nut-blank supplied upon the endless belt Q, by the slide O², from the hopper O, can be moved upon the trap door M², when the continual rotation of the cam Z, permits the slide N', and feeding fingers N², to again move downward to push a nut blank on the trap doors M², downward therethrough and over the upper end of the shank of the threading tap K', where it rests for a moment upon the upper pair of jaws h', until the continual rotation of the cams R' and R², moves the lower pair of slides H', and jaws h' carried thereby, forward to grasp the shank of the threading tap K', and permits the upper pair of jaws to move backward, when the nut-blank will drop downward on the tap shank onto the lower pair of jaws h'. The cam R³, now by means of the lever Y, raises the sleeve E, and nut holder F, to a point adjacent to the lower pair of jaws h', which permits the hooks g', to open outwardly, and the cams R², permits the lower pair of jaws h', to release the shank of the tap after the same has been grasped by the upper pair of jaws h', and the nut-blank falls into the upper end of the rotating nut-holder F, which is then permitted to move downward into the hollow shaft C, which causes the hooks g², to engage the upper face of the blank and force it downward upon the thread-cutting portion of the tap K', while the blank is being rotated, until it falls off of the lower end of the tap K', and through the hollow shaft C, onto the screen a', of the pan A², and during this operation oil from the chamber A', is being pumped through the pipe 12, by the pump X, to the tap K, and flows thereabout through the nut-holder F, hollow shaft C, and screen a', back to the chamber A'. During the operation above described, the endless belt Q, is caused to travel toward the feeding fingers N², and the nut-raising slide is given vertical reciprocation by means of the shaft 2, and miter gears T and 2', shown in Fig. 1, and the miter gears 10 and 11, and shaft 9, shown in Fig. 4, and the crank and lever and link mechanism shown in Fig. 3, and as nut-blanks are raised upward by the slide O², they roll or slide from the inclined surface of the upper end thereof, onto the belt Q, and as they are carried forward by the belt, the curved finger engages such blanks as are vertical edgewise upon the belt and turns them over upon their sides, or if several blanks are superimposed upon each other, all but the lowermost ones are pushed off thereby into the hopper, so that there is a continuous train of nut blanks being moved forward against the feeding fingers N², when they are lowered, and onto the trap door M³, when the feeding fingers are raised by the belt Q.

If for any reason the sleeve E', and nut-holder F, do not move downward after a nut blank has been dropped by the lower pair of jaws h', I have provided a latch bar 13, (see Fig. 6) which is secured upon the bar L, and extends upwardly therefrom, in front of the lever Z, on which latch-bar 13, is then secured a spring 14, which carries a stud 15, adapted to extend through an opening, shown in broken lines, and engage the lever Z, on its downward movement and retain it in a raised position. If, however, the sleeve E', and nut-holder F, move downward, I have provided a rod 16, which is secured to the sleeve E', the upper end of which is adapted to enter between the latch-bar 13, and spring 14, so as to withdraw the stud 15, out of the path of the lever 2, and permit it to move downward, and the feeding fingers N², to push another blank through the trap-doors M².

Having thus illustrated and described my invention so as to enable others to utilize the same, what I claim as new and desire to secure by Letters-Patent, is:—

1. In a machine of the character described, a hollow vertical shaft having longitudinal slots through the wall of the upper portion thereof, a nut holding sleeve vertically movable within said hollow shaft, a ring on said hollow shaft, having a circumferential slot therein, pins secured in said ring and extending inwardly through the longitudinal slots in said hollow shaft and into the wall of said nut-holding sleeve, a ring in said circumferential slot, mechanism pivoted to said last mentioned ring adapted to give vertical movement to said rings and nut-holding sleeve, and mechanism adapted to rotate said hollow shaft, substantially as set forth.

2. In a machine of the character described, a hollow vertical shaft, a nut-holding sleeve vertically movable within said hollow shaft, means to cause said sleeve to rotate in unison with said hollow shaft, mechanism adapted to engage said nut-holding sleeve and impart vertical movement thereto, mechanism to rotate said hollow shaft, clamping jaws above said hollow shaft adaped to clamp the shank of a threading-tap at spaced points thereon and support said tap in a position concentric with said nut-holding sleeve, mechanism adapted to feed nut-blanks onto the upper end of the shank of said thread cutting tap at proper intervals, mechanism adapted to open and close said clamping jaws alternately in opposing pairs upon said tap shank so as to permit the dropping of a nut blank at each movement of said jaws, and mechanism adapted to raise said nut-holding sleeve to receive a nut-blank as the lower pair of jaws are opened, substantially as set forth.

3. In a machine of the character described, a hollow vertical shaft, a nut holding sleeve vertically movable within said shaft, spring actuated hooks adapted to engage the upper surface of a nut blank entering the upper end of said sleeve secured thereto, shoulders on said hooks adapted to be engaged by the inner surface of said hollow shaft when said sleeve is lowered thereinto to press said hooks inward over a nut blank, means to cause said sleeve to rotate in unison with said hollow shaft, mechanism adapted to engage and lift said sleeve upwardly to receive a nut blank, and permit it to recede downwardly into said hollow shaft so as to cause said hooks to engage the upper surface of a blank, mechanism adapted to support a threading tap concentric with said nut holding sleeve while permitting a nut blank to pass downwardly over the shank thereof, and mechanism adapted to place a nut blank on the upper end of said tap shank at proper intervals, substantially as set forth.

4. In a machine of the character described, a hollow vertical shaft, mechanism to rotate said shaft, a sleeve slidably mounted within and rotatable with said shaft, having an opening therethrough adapted to receive and permit the passage of a nut therethrough, mechanism engaging said sleeve by means whereof the same may be raised and lowered, longitudinally slidable jaws mounted in opposing pairs in guides above said hollow shaft, said pairs of jaws being in spaced relation to each other, a threading tap alternately engaged and supported by a pair of said jaws concentric with said hollow shaft, a nut receiving plate having an opening therethrough concentric with said tap, weight actuated trap doors pivoted to said plate and partially closing said opening, vertically moving feeding fingers adapted to pass through said opening and between said trap doors to push a nut blank downwardly onto the shank of said tap, blank supplying mechanism adapted to move blanks forward onto said trap doors, mechanism to raise said feeding fingers at pre-determined intervals and permit them to lower, mechanism adapted to close the lower pair of jaws upon the shank of the threading tap, and open the upper pair of jaws, and mechanism to cause the nut receiving sleeve to rise upwardly to receive a blank when the lower pair of jaws open, substantially as set forth.

5. In a machine of the character described, a hollow vertical shaft, mechanism to rotate said shaft, a sleeve slidably mounted within and rotatable with said shaft, having an opening therethrough adapted to receive and permit the passage of a nut therethrough, mechanism engaging said sleeve by means whereof the same may be raised and lowered, longitudinally slidable jaws mounted in opposing pairs in guides above said hollow shaft, said pairs of jaws being in spaced relation to each other, a threading tap alternately engaged and supported by a pair of said jaws concentric with said hollow shaft, a nut receiving plate having an opening therethrough concentric with said tap, weight actuated trap doors pivoted to said plate and partially closing said opening, vertically moving feeding fingers adapted to pass through said opening and between said trap doors to push a nut-blank downwardly onto the shank of said tap, a continuous belt adapted to carry and move nut-blanks onto said trap-doors, a hopper, mechanism adapted to place nut-blanks from said hopper onto said belt, guide mechanism adapted to arrange nut-blanks in a flat-wise longitudinal row on said belt, mechanism to cause said belt to carry said row of nut-blanks toward said trap-doors, mechanism to raise said feeding fingers at pre-determined intervals and permit them to lower, mechanism adapted to close the lower pair of jaws upon the shank of the threading tap, and open the upper pair of jaws, and mechanism to cause the nut receiving sleeve to rise upwardly to receive a blank when the lower pair of jaws open, substantially as set forth.

6. In a machine of the character described, a base frame having a chamber therein, a screened pan in the upper portion of said chamber, a gear case above said chamber, a shaft mounted longitudinally in said chamber, worms secured on said shaft, means to supply power to rotate said shaft, another shaft longitudinally mounted in said chamber, a miter gear on said shaft, and spur gears on said shafts intermeshing with each other, a hollow vertical shaft mounted in said gear case and extending upwardly through the upper wall thereof, a miter gear secured on said hollow shaft and intermeshing with the first named gear, a nut holding sleeve slidably mounted in and non-rotatable with relation to said hollow shaft, spring actuated hooks secured to said sleeve, shoulders on the shanks of said hooks adapted to be engaged by said hollow shaft to press said hooks inward, mechanism engaging said sleeve and adapted to raise said sleeve upwardly within said hollow shaft, an upright frame mounted upon said gear case having horizontal slide-ways in the face thereof, and slotted recesses in the rear walls of said slide-ways, springs in said recesses, slides in said slide-ways, studs on the rear faces of said slides extending backwardly into said recesses and engaged by said springs, jaws adjustably secured in said slides and adapted to grip and support a thread-cutting tap concentric with said hollow shaft, a threading tap supported thereby, vertical shafts journaled in said gear-case and said upright frame adjacent to the outer ends of said slides, cams on said vertical shafts adapted to engage said slides during the rotation of said shafts and simultaneously operate the upper pair toward each other, and when said upper pair of jaws have gripped the threading tap, to permit the lower pair of said slides to recede from engagement with said tap, worm gears secured on said vertical shafts and intermeshing with the worms on the first mentioned horizontal shaft, lever mechanism adapted to raise and lower said nut-holding sleeve, a cam on one of said vertical shafts adapted to actuate said lever to raise said sleeve when the lower pair of said slides start on their backward movement, a blank receiving plate having an opening therethrough concentric with said hollow shaft adapted to receive blanks from said belt, weight actuated trap doors pivoted to said plate, a hopper, and mechanism adapted to feed nut-blanks from said hopper onto said trap-doors, vertical guides secured on said upright frame, a slide mounted thereon, feeding fingers secured thereon adapted to be moved downwardly through the opening in said nut receiving plate and push a blank downwardly through said trap doors onto the upper end of the shank of said threading tap, lever and link mechanism to operate said slide and fingers, a cam on one of said vertical shafts to actuate said lever mechanism, and shaft and gear mechanism adapted to actuate said conveyer belt, substantially as and for the purpose set forth.

In testimony whereof I affix my signature in presence of two witnesses.

GEORGE ALEXANDER.

Witnesses:
H. M. STURGEON,
P. V. GIFFORD.